(12) United States Patent
Weaver

(10) Patent No.: US 8,857,515 B2
(45) Date of Patent: Oct. 14, 2014

(54) SILICA CONTROL AGENTS FOR USE IN SUBTERRANEAN TREATMENT FLUIDS

(75) Inventor: Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 247 days.

(21) Appl. No.: 13/113,533

(22) Filed: May 23, 2011

(65) Prior Publication Data

US 2012/0298368 A1 Nov. 29, 2012

(51) Int. Cl.
  *E21B 43/26* (2006.01)
  *C09K 8/66* (2006.01)
  *E21B 43/267* (2006.01)

(52) U.S. Cl.
  CPC . *E21B 43/26* (2013.01); *C09K 8/66* (2013.01); *E21B 43/267* (2013.01)
  USPC ............... 166/305.1; 166/380.2; 166/90.1

(58) Field of Classification Search
  CPC ....... E21B 43/16; E21B 43/26; E21B 43/267; C09K 8/66
  USPC .................. 166/305.1, 380.2, 90.1
  See application file for complete search history.

(56) References Cited

U.S. PATENT DOCUMENTS

| | | | | |
|---|---|---|---|---|
| 2,165,824 | A * | 7/1939 | Vietti et al. | 507/141 |
| 3,640,343 | A * | 2/1972 | Darley | 166/292 |
| 4,304,666 | A * | 12/1981 | Van Note | 210/197 |
| 6,333,005 | B1 * | 12/2001 | Nguyen | 422/13 |
| 6,983,799 | B2 * | 1/2006 | Reddy et al. | 166/291 |
| 2006/0089265 | A1 * | 4/2006 | Hanes et al. | 507/203 |
| 2008/0202815 | A1 * | 8/2008 | Dixon | 175/65 |
| 2010/0089579 | A1 | 4/2010 | Reyes et al. | |
| 2011/0089115 | A1 * | 4/2011 | Lu | 210/683 |
| 2012/0145401 | A1 * | 6/2012 | Reyes | 166/305.1 |

OTHER PUBLICATIONS

National Silicates, PQ Corporation Industrial Chemicals Division Article, "Fundamentals of Silicate Chemistry," 2005.
Alford et al., "Research Into Lubricity, Formation Damage Promises to Expand Applications for Silicate Drilling Fluids"; SPEI-IADC Drilling Conference held in Amsterdam, The Netherlands, Feb. 27-Mar. 1, 2001, SPE/IADC 67737.
Griffin, et al., "Design of Chemically Balanced Polymer Drilling Fluid Leads to a Reduction in Clay Destabilization," SPE Drilling Engineering, 1986.
Nesbitt, et al., "Shale Stabilization Principles," 60th Annual Technical Conference and Exhibition of the Society of Petroleum Engineers held in Las Vegas, NV, Sep. 22-25, 1985, SPE 14248.
PQ Corporation Industrial Chemicals Division Article, "Silicate Drilling Fluid Technologies, The EcoDrill Advantage," 2001.

(Continued)

Primary Examiner — Zakiya W Bates
Assistant Examiner — Silvana Runyan
(74) Attorney, Agent, or Firm — McDermott Will Emery LLP; Craig W. Roddy

(57) ABSTRACT

Methods involving the use of subterranean treatment fluids comprising a silica control agent and an aqueous base fluid wherein the treatment fluid is placed into a portion of a subterranean formation and wherein the silica control agent is present in an amount of at least 75% of the saturation point in the treatment fluid. The methods include fracturing and gravel packing operations using a treatment fluid including a silica control agent present in an amount of at least 75% of the saturation point in the treatment fluid.

16 Claims, 1 Drawing Sheet

(56) References Cited

OTHER PUBLICATIONS

Tare et al., "Stabilizing Boreholes While Drilling Reactive Shale Formations with Silicate-Base Drilling Fluids," Drilling Contractor, May/Jun. 2000, pp. 42-44.

K. Iler, "The occurrence, dissolution, and deposition of Silica," p. 56, The Chemistry of Silica, A Wiley-Interscience Publication, New York (1979).

* cited by examiner

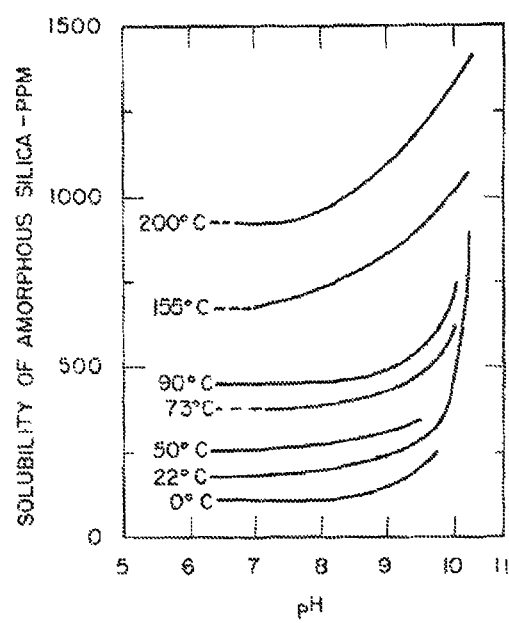

SILICA CONTROL AGENTS FOR USE IN SUBTERRANEAN TREATMENT FLUIDS

BACKGROUND

The present invention relates to fluids useful as subterranean treatment fluids, and, at least in some embodiments, to novel silica control agents used with fracturing fluids, and their associated methods of use.

A wellbore in a subterranean formation may penetrate portions of the formation that may be susceptible to degradation. Formation degradation, such as swelling, sloughing, and/or release of fines, may substantially decrease the stability of the wellbore. In an extreme case, degradation may decrease the stability of the wellbore to such an extent that the wellbore collapses.

Many formation strata, particularly sandstone, shale, and/or clay, are reactive with water, resulting in ion exchange and absorption of aqueous fluids. The presence of aqueous fluids, such as formation fluids or treatment fluids, may lead to significant swelling of the strata and corresponding reductions in the mechanical strength of the subterranean formation. Moreover, the fine aggregate that composes the strata can pose problems if exposed to high stresses (e.g., shear and pressure from the flow of hydraulic fracturing fluids). For example, under high stress, shale can mechanically fail, resulting in the generation of fine clay materials that can be highly mobile in produced fluids. This can result in wellbore sloughing and large quantities of solids production, plugging screens and/or filling separators on the surface. To combat these problems, heretofore, brines that contain high ion concentration have been used in an attempt to reduce ion exchange and the reactivity of the strata.

Hydraulic fracturing may be useful for increasing the conductivity of a subterranean formation. Hydraulic fracturing operations generally involve pumping a treatment fluid (e.g., a fracturing fluid) into a wellbore that penetrates a subterranean formation at a sufficient pressure to create or enhance one or more pathways, or "fractures," in the subterranean formation. An example of a hydraulic fracturing operation useful for shale formations is "high rate water frac," wherein large volumes of an aqueous treatment fluid are injected into a wellbore at a high fluid flow rate. Treatment fluids often comprise aqueous solutions in which the ionic content has been adjusted to reduce clay swelling and/or clay and fines dispersion, but which may result in reduced fracture porosity. The treatment fluid may comprise particulates (e.g., proppant particulates) that are deposited in the resultant fractures. The particulates may help prevent the fractures from fully closing upon release of the hydraulic pressure, forming conductive channels through which fluid may flow between the formation and the wellbore. However, pumping particulate slurries through a tubular conduit, such as a steel pipe, may scrape, scour, and/or erode the interior surfaces of the tubular conduit. The damage to the interior surfaces may increase with the pumping rate. Consequently, high rate water frac operations may be more susceptible to such damage.

Exposed formation surfaces and the surfaces of particulates used in treatment fluids generally comprise minerals, which may react with other substances (e.g., water, minerals, treatment fluids, and the like) disposed in the subterranean formation. Such chemical reactions may be caused, at least in part, by conditions created by mechanical stresses on those minerals (e.g., fracturing of the mineral surfaces or the compaction of particulates). One type of stress-activated reaction may be diageneous reactions. As used herein, the terms "diageneous reactions," "diageneous reactivity," and "diagenesis" include any chemical and/or physical process that, in the presence of water, moves a portion of the mineral in a particulate and/or converts a portion of the mineral in a particulate into some other form or material. A mineral that has been so moved or converted is herein referred to as a "diageneous product" or "diagenic product." Any formation surface or particulate comprising a mineral may be susceptible to diageneous reactions, including silicate minerals (e.g., quartz), silicates and glass materials, metal oxide minerals, and the like. Diagenesis reactions are thought to occur where two water-wetted mineral surfaces are in contact with each other at a point under strain. The localized mineral solubility near that point under strain may increase, causing the minerals to dissolve. Minerals in solution may then diffuse through the water film outside of the region where the mineral surfaces are in contact, where they may precipitate out of solution. The precipitate can plug the formation or screens, resulting in a decrease in production.

BRIEF DESCRIPTION OF THE DRAWINGS

These drawings illustrate certain aspects of some of the embodiments of the present invention, and should not be used to limit or define the invention.

FIG. 1 shows the solubility of amorphous silica versus pH at different temperatures.

SUMMARY

The present invention relates to fluids useful as subterranean fracturing fluids, and, at least in some embodiments, to novel silica control agents used with fracturing fluids, and their associated methods of use.

Some embodiments of the present invention provide methods comprising providing a treatment fluid comprising a silica control agent and an aqueous base fluid, wherein the silica control agent is present in an amount of at least 75% of the saturation point in the treatment fluid; and, placing the treatment fluid in a subterranean formation.

Still other embodiments of the present invention provide methods comprising providing a treatment fluid comprising a silica control agent and an aqueous base fluid, wherein the silica control agent is present in an amount of at least 75% of the saturation point in the treatment fluid; contacting a subterranean formation with the treatment fluid at a pressure sufficient to fracture a portion of the subterranean formation; and, recovering at least a portion of the treatment fluid.

The features and advantages of the present invention will be apparent to those skilled in the art. While numerous changes may be made by those skilled in the art, such changes are within the spirit of the invention.

DESCRIPTION OF THE PREFERRED EMBODIMENTS

The present invention relates to fluids useful as subterranean fracturing fluids, and, at least in some embodiments, to novel silica control agents used with fracturing fluids, and their associated methods of use.

One of the many potential advantages of the methods of the present invention is that results from hydraulic fracturing treatments with treatment fluids comprising a silica control agent may be improved over previous hydraulic fracturing, particularly for high rate water fracturing operations. Such improved results may make production from some marginal wells more economical. Additionally, since treatment fluids comprising a silica control agent would dissolve very little, if any, in-situ silica, and would also provide thin silicate coatings on formation surfaces, diageneous minerals may remain cemented into place in the formation. That is, a thin film of silica acts to glues everything together. Putting down water without silica dissolves the thin layer and thus allows the larger particles previously being held in place to migrate with fluids. As used herein, the term "in-situ silica" refers to silica within the formation and may be connate silica or silica resulting from a previous treatment operation. By avoiding the dissolution of silica, the treatment operations of the present invention stabilize shale strata and reduce formation degradation, sloughing, and release of fines. Thus, poorly consolidated formations may be made more competent. Another advantage of the methods of the present invention is low added operational costs, as suitable silica control agents are readily available and relatively inexpensive. Additionally, in some embodiments the silica control agent may be used at relatively low concentrations and may have fewer environmental effects than alternative chemicals used to improve fracturing performance. For example, potassium silicates are commonly used as fertilizers and may be readily disposed of without further treatment. Additionally, since silicates may act as corrosion inhibitors, pumping silicate saturated treatment fluids may reduce or inhibit the damaging effects of pumping particulate slurries through a tubular conduit.

In accordance with embodiments of the present invention, a method may comprise adding a silica control agent to a treatment fluid, thereby forming a silicate treatment fluid, and treating a subterranean formation with the silicate treatment fluid. In some preferred embodiments, the system is balanced such that the silica in the fluid substantially remains in the fluid and the silica in the formation substantially remains in the formation. As used herein, the term "treatment," or "treating," refers to any subterranean operation performed in conjunction with a desired function and/or for a desired purpose. The term "treatment," or "treating," does not imply any particular action. As used herein, the term "treatment fluid" refers to any fluid that may be used in a subterranean application in conjunction with a desired function and/or for a desired purpose. The term "treatment fluid" does not imply any particular action by the fluid or any component thereof.

Silica (silicon dioxide) appears naturally in a number of crystalline and amorphous forms. As used herein, the term "silicates" refers to salts derived from silica or the silicic acids, especially orthosilicates and metasilicates, which may combine to form polysilicates. Silicates are commonly found in nature as compounds including a $SiO_2$ group or a $SiO_4$ group and one or more metallic ions such as potassium or sodium. As used herein, the use of the term "silica" or solutions comprising silica in the context of a silica control agent refers to both silica and silicates. Most silicates, except the alkali silicates, are sparingly soluble in water. Silicate solubility in a fluid depends on a number of factors including pH, temperature, pressure, and ionic composition of the fluid. By way of example, FIG. 1 shows the effect of pH on silicate solubility at various temperatures. For example, at room temperature, silicate solubility in water may be about 100 ppm, increasing with pH and temperature.

Solubility is generally understood as the ability of a substance to dissolve in a solution. As used herein, a "saturated solution" generally refers to a solution that contains at about 100% as much dissolved materials as it can hold at a given temperature and pressure under equilibrium conditions. The term "supersaturation" refers to a solution that contains more of a dissolved material than allowed by the solubility product. Generally, a super-saturated solution may be formed by increasing the temperature, pH, pressure, or some other factor that tends to increase solubility so that additional material is dissolved into the solution. The then temperature is lowered (or pH, etc.) such that an increased amount of dissolved material remains for a period of time even after factor increasing solubility is removed. The methods of the present invention preferably include silica in the treatment fluid in an amount at least about 75% of the saturation level at equilibrium. In some embodiments the silica is present in the treatment fluid in an amount of at least about 80%, 85%, 75%, or 99% of the saturation level at equilibrium.

In the presence of an "under-saturated solution," a solute may have tendency to dissolve. Thus, under typical conditions experienced by under-saturated fracturing fluids, in-situ silica may be dissolved by the fracturing fluid when it is placed into the formation, thereby causing damage. Without being limited by theory, it is believed that the silicates coat the surface of the exposed formation thereby preventing water interaction and preserving the original formation characteristics.

The methods of the present invention, in addition to being useful to avoid dissolving in-situ silica, may also be useful to help to hold in place various diageneous minerals. That is, formations including sandstone zones or shale zones, the diageneous minerals therein may be cemented into place by thin silicate coatings. As used herein, the terms "coat," "coating," and their derivatives do not imply any minimum degree of coverage of a surface. Such silicate coatings may have tendency to dissolve in the presence of fluids that are under-saturated in silicate concentration. Since many treatment fluids, such as hydraulic fracturing fluids, are highly under-saturated in silicate concentration, fracturing treatments may rapidly dissolve this silicate cementing material, resulting in desegregation of fine materials and degradation of the formation. Since silicate solubility increases with temperature, this effect becomes even more pronounced at higher formation temperatures. As formation degradation has previously been attributed to clay mineral damage from ionic exchange, fracture fluids have heretofore included electrolytes to provide ionic stabilization. No consideration has been given to the effects of formation silica dissolution. Consequently, no consideration has been given to the significance of the concentration of silicate dissolved in a fracture fluid.

In some embodiments of the invention, downhole conditions, including temperature, pressure, and pH, are measured and/or estimated to ascertain an appropriate silica concentration for a treatment fluid comprising a silica control agent. The downhole conditions may thereby determine a minimum silica control agent concentration such that the concentration is near saturation or supersaturated. In some embodiments, it may be desirable to use a treatment fluid comprising a silica control agent with a silica concentration that is higher than the silica saturation concentration for the specified downhole conditions. In some embodiments, the treatment fluid comprising a silica control agent may be supersaturated with silica. In preferred embodiments, the treatment fluid is formed such that it will be saturated with silica at the pH and temperature present within the subterranean formation into which the treatment fluid is placed. Table 1, below, shows the effect of pH on the solubility of amorphous silica at 25° C.

TABLE 1

| pH | Solubility in ppm at 25° C. |
|---|---|
| 6-8 | 120 |
| 9 | 138 |
| 9.5 | 180 |

TABLE 1-continued

| pH | Solubility in ppm at 25° C. |
|---|---|
| 10 | 310 |
| 10.6 | 876 |

Without limiting the invention to a particular theory or mechanism of action, it is nevertheless currently believed that silica may act as a binder of clay, sand, diageneous minerals, clasts, and/or other fine particulates in subterranean formations. Water and other aqueous fluids that are under-saturated with silica may act to dissolve the silica binder, thereby loosening or releasing the particulates. The particulates may then be dislodged by the forces exerted by treatment and/or formation fluids, flowing with the fluids into formation pores, proppant pack voids, fractures, wellbores, and/or tubular conduits and other pumping equipment. The dislodged particulates thereby damage the permeability of the formation and reduce the production capability of the operation. This problem may be especially acute in sandstone, clay, and/or shale formations, wherein the strata present multiple layers, resulting in additional surface area exposure.

The silica control agents suitable for use in the methods of the present invention generally comprise any compound that is capable of binding particulates, minimizing particulates migration, and/or modifying the stress-activated reactivity of surfaces in subterranean formations. In some embodiments, the silica control agent may comprise a compound chosen from the group consisting of: silica, silicates (e.g., orthosilicates, pyrosilicates, cyclic-silicates, single chain silicates, double chain silicates, sheet silicates, colloidal silicates). Combinations of these also may be suitable. In an embodiment, the silica control agent may be provided by a natural mineral comprising silica or a silicate. Suitable examples of naturally occurring minerals comprising silica or a silicate include, but are not limited to, phenacite, willemite, zircon, olivine, garnet, thortveitite, benitoite, beryl, pyroxenes, enstatite, spodumene, pollucite, tremolite, crocidolite, talc, petalite, cristobalite, and any combination thereof. One skilled in the art will recognize that in order to be able to use naturally occurring silicates they would need to be finely ground in order to be sufficiently soluble. As used herein, the term "finely ground" refers to mesh sizes smaller than or equal to 270 U.S. Mesh (53 microns), 325 U.S. Mesh (44 microns), 400 U.S. Mesh (37 microns), 550 U.S. Mesh (25 microns), 800 U.S. Mesh (15 microns), or 1250 U.S. Mesh (10 microns). Other suitable silicates include potassium silicate, calcium silicate, sodium aluminium silicate, and sodium silicate. Suitable commercially available silica control agents may include INJECTROL® sealant, commercially available from Halliburton Energy Services, Inc., of Duncan, Okla. However, dilution to near the saturation point may be required for such products to be suitable silica control agents in order to avoid precipitation and plugging of the formation. In some preferred embodiments non-polymeric metal silicates, such as sodium silicate or potassium silicate, may be preferred. In some preferred embodiments the silicate may be sodium silicate having a weight ratio of $SiO_2$ to $Na_2O$ ranging from about 3.25:1 to 1.5:1. In some preferred embodiments the silicate may be potassium silicate having a ratio of $SiO_2$ to $K_2O$ ranging from about 2.5:1 to 1.5:1.

The type and amount of silica control agent included in a particular method of the invention may depend upon, among other factors, the composition and/or temperature of the subterranean formation, the chemical composition of formations fluids, the flow rate of fluids present in the formation, the effective porosity and/or permeability of the subterranean formation, pore throat size and distribution, and the like. Furthermore, the concentration of the silica control agent may be varied to, among other things, provide for a more rapid coating of the silica control agent or to allow deeper penetration into the subterranean formation. It is within the ability of one skilled in the art, with the benefit of this disclosure, to determine the type and amount of silica control agent to include in the methods of the present invention to achieve the desired results. As noted above, FIG. 1 shows the solubility of amorphous silica versus pH at different temperatures. In some exemplary embodiments, the concentration of silica control agent in the treatment fluid may be at least about 50 ppm. In some embodiments, the concentration may be between about 500 ppm and about 5,000 ppm. In other embodiments, the concentration may be as high as about 50,000 ppm. In some embodiments, the concentration of silica control agent in the treatment fluid may be in an amount ranging from a lower limit of about 10 ppm, 20 ppm, 25 ppm, 50 ppm, 75 ppm, 100 ppm, 125 ppm, 250 ppm, 375 ppm, 500 ppm, 750 ppm, or 1000 ppm to an upper limit of about 50,000 ppm, 40,000 ppm, 30,000 ppm, 25,000 ppm, 20,000 ppm, 15,000 ppm, 10,000 ppm, 5,000 ppm, 2,500 ppm, 1,000 ppm, 750 ppm, 500 ppm, 250 ppm, 125 ppm, 100 ppm, or 75 ppm, and wherein the percentage of consolidating agent may range from any lower limit to any upper limit and encompass any subset between the upper and lower limits. It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

The silica control agents suitable for use in the methods of the present invention may be provided in any suitable form such as a colloidal suspension or a liquid. In some embodiments, the silica control agent may be in the form of fine particulates suspended in a liquid. In some embodiments, the silica control agent colloidal suspension has an average diameter of the colloid of about 0.01 micrometers ("µm") to about 300 µm. In some embodiments, the silica control agent colloidal suspension has an average diameter of the colloid of about 0.01 µm to about 100 µm. In some embodiments, the silica control agent colloidal suspension has an average diameter of the colloid of about 0.01 µm to about 10 µm. The size distribution of the silica control agent particles used in a particular composition or method of the invention may depend upon several factors, including, but not limited to, the size distribution of the particulates present in the subterranean formation, the effective porosity, and/or permeability of the subterranean formation, pore throat size and distribution, and the like.

Aqueous base fluids that are suitable for use in a silicate saturated treatment fluid of the present invention may be any aqueous-based treatment fluid suitable for downhole use, including, but are not limited to, water, fresh water, salt water, brine (saturated salt water), seawater, aqueous gels, gases, water-external emulsions, foams, or any other aqueous liquid that does not adversely react with the other components used in accordance with this invention or within the subterranean formation. When used, salts used or present in the aqueous base fluids should not adversely affect the solubility of the silica control agent in the treatment fluid. As used here, the term "salt" is used in its ordinary meaning, referring to materials commonly used in the industry in the preparation of completion brines; and including materials such as potassium chloride, sodium chloride, ammonium chloride, calcium chloride, and calcium bromide. In some embodiments, an aqueous base fluid that comprises a brine may be desirable because the brine may reduce swelling of clay that is present in the subterranean formation, thus preventing the clay from swelling and blocking the flowpath. Suitable aqueous gels may be comprised of water and one or more gelling or viscosifying agents. Optionally, an aqueous gel further may comprise a crosslinking agent for crosslinking the gelling agent and further increasing the viscosity of the fluid. Suitable emulsions may be comprised of two immiscible liquids such as an aqueous liquid and a hydrocarbon. The base fluid may also be foamed or unfoamed as desired for a particular application and may include, for example, air, carbon dioxide, and/or nitrogen. Suitable aqueous base fluids may contain salt concentrations, such as of KCl, range from 2% (w/v) to 7% (w/v) to, among other things, satisfy the ionic balance to control clay swelling and fines migration. It is within the ability of one skilled in the art with the benefit of this disclosure to determine how much, if any, salt may be desirable in the aqueous base fluid used in the present invention.

The base fluids used in the subterranean treatment fluids of the present invention can be any fluid suitable for use as a base fluid in fracturing or gravel packing operations. Suitable base fluids include, but are not limited to, water, aqueous gels, viscoelastic surfactant gels, oil gels, gases, liquefied gases, liquefied hydrocarbons, emulsions (oil in water), invert emulsions (water in oil), and combinations thereof. Suitable aqueous gels are generally comprised of water and one or more gelling or viscosifying agents. Optionally, the aqueous gel further may comprise a crosslinking agent for crosslinking the gelling agent and further increasing the viscosity of the fluid. Suitable viscoelastic surfactant gels may comprise a viscoelastic surfactant and water. Suitable emulsions can be comprised of two immiscible liquids such as an aqueous liquid or gelled liquid and a hydrocarbon. Suitable water used in the base fluids can be fresh water, salt water (e.g., water containing one or more salts dissolved therein), brine (e.g., saturated salt water), seawater, or any other aqueous liquid that does not adversely affect other components in the subterranean treatment fluid. The base fluid may also be foamed or unfoamed as desired for a particular application and may include, for example, air, carbon dioxide, and/or nitrogen.

In some embodiments, the silicate saturated treatment fluid may comprise particulates, such as proppant particulates. Such particulates may be comprised of any material suitable for use in subterranean operations. Examples include, but are not limited to, sand, bauxite, ceramic materials, glass materials (e.g., glass beads), polymer materials, polytetrafluoroethylene (commonly known as TEFLON®) materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates, and combinations thereof. Composite particulates also may be used, wherein suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, ground nut/seed shells or husks, saw dust, ground cellulose fiber, and combinations thereof. Typically, the particulates have a size in the range of from about 2 to about 400 mesh, U.S. Sieve Series. In particular embodiments, particulate size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, fibrous materials may be included. In some embodiments, the particulates may be coated with any suitable resin or tackifying agent known to those of ordinary skill in the art.

Optionally, the silicate saturated treatment fluids of the present invention may contain additional additives such as clay stabilizers, oxygen scavengers, corrosion inhibitors, scale inhibitors, iron control agents, antifoam agents, dispersants, viscosifiers, weighting agents, wetting agents, coating enhancement agents, and the like, or any other additive that does not adversely affect the treatment fluid.

The methods of the present invention may be applicable to horizontal, vertical, deviated (a wellbore that is not vertical but is less than fully horizontal), or otherwise nonlinear wellbores in any type of subterranean formation. The methods may be applicable to injection wells as well as production wells, including hydrocarbon wells. A wellbore penetrating a subterranean formation being treated may contain one or more pipes or casing strings (e.g., a "cased" or "partially cased" wellbore). In certain embodiments, the wellbore may be uncased. In those embodiments where the portion of the wellbore penetrating the portion of the subterranean formation being treated is cased or partially cased, perforations or holes may be created in the casing that allow fluid communication between the interior of the casing and formation(s) outside the casing. In certain embodiments, the fractures in the subterranean formation may be created or enhanced via methods of the present invention by directing a fluid and/or a tool through these perforations or holes in the casing. The perforations or holes in the casing may be made by any suitable means known in the art. In certain embodiments, these perforations or holes may be present in the casing before it is placed in the wellbore. In certain embodiments, the perforations or holes in the casing may be created using the same tool or method used to create or enhance the slots in the unconsolidated portion of the subterranean formation, for example, by using a hydrojetting technique. In other embodiments, the perforations or holes may be created using some other method or apparatus prior to or during the course of conducting a method of the present invention.

The methods of the present invention may be used to treat or consolidate a single interval of a subterranean formation, or may be repeated to consolidate portions of the formation in several different intervals individually. In embodiments where several different intervals are treated, the several intervals may be penetrated by a single wellbore, different contiguous wellbores, or different wellbores that are not contiguous.

Some embodiments of the invention provide methods for forming a treatment fluid comprising a silica control agent. In some embodiments, a silica or silicate solution may be added "on the fly" to provide a treatment fluid near the saturation point or a supersaturated treatment fluid (e.g., fracturing water). The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. For example, a silicate saturated treatment fluid may be prepared by continuously combining (a) an aqueous base fluid with (b) a silica control agent. As these two liquids are continuously combined, the resultant mixture is pumped into a subterranean formation. Furthermore, in some embodiments, one or more of the various treatment fluids used in connection with the present invention may be batch mixed.

Treatment fluids comprising a silica control agent may be used in connection with a variety of subterranean treatments, and the methods of the present invention may be used prior to, in combination with, or after any type of subterranean operation being performed in the subterranean formation, including, but not limited to, fracturing operations, gravel-packing operations, frac-packing operations (i.e., combination of fracturing and gravel-packing operations), steam treatments, steam injections, and the like. In some remedial embodiments of the present invention, after a fracturing treatment or a gravel pack treatment has been performed, a treatment fluid comprising a silica control agent may be introduced into an unconsolidated portion of a subterranean formation to stabilize particulates within the unconsolidated portion. The treatment fluid comprising a silica control agent may create or enhance a thin silicate coating upon and around any diageneous minerals and/or loose fines within a proppant pack in a fracture, thereby locking them in place. In exemplary embodiments, this may result in fines stabilization without damaging the permeability of the formation. Some embodiments may even provide for rehabilitation of clogged formations, wherein the silica control agent may be added to a fracture fluid. High rate fracturing with a fracturing fluid comprising a silica control agent may temporarily increase the permeability of the formation. The silica in the fracture fluid may then form a silicate coating, stabilizing the formation in the higher permeability state. The treatment fluid comprising a silica control agent may also stabilize gravel particulates around a screen and formation sand and fines particulates surrounding the wellbore to remediate a screen failure. In addition to remedial treatments, a treatment fluid comprising a silica control agent may be introduced to a subterranean formation as part of a pre-pad fluid in a gravel packing treatment, fracturing-packing treatment, extension-pack treatment, or hydraulic fracturing treatment. As used herein, the term "fracturing" refers to placing a fluid into a subterranean formation at a rate/pressure sufficient to create or extend at least one fracture therein. That is, fracturing occurs above matrix flow rate/matrix flow pressure. Additionally, the treatment fluids comprising a silica control agent may be used in the treatment of a formation following an acid treatment, e.g., to stabilize the near-wellbore region of the formation, the part of the formation surrounding the wormholes or channels created by the acid treatment, and/or the fracture faces of the formation. In view of the foregoing, one of ordinary skill in the art with the benefit of this disclosure will appreciate the variety of subterranean operations that may employ treatment fluids comprising a silica control agent to stabilize a subterranean formation, reduce particulate migration, and minimize the production of particulates.

Embodiments in which the treatment fluids comprising a silica control agent of the present invention may be used in combination with one or more other subterranean treatments include using a treatment fluid comprising a silica control agent to stabilize and consolidate proppant particulates that are present in a fracture created during a fracturing operation, and/or using a treatment fluid comprising a silica control agent to treat a formation before gravel packing. According to some embodiments, the portion of the subterranean formation to which a treatment fluid comprising a silica control agent is introduced may be in or near a fracture in a subterranean formation, for example, a fracture which was created during a fracturing operation and which comprises proppant particulates. The silica coating resulting from the treatment fluid comprising a silica control agent may stabilize the proppant particulates in the fracture and reduce migration of the proppant from the fracture. According to some embodiments, the treatment fluid comprising a silica control agent may be introduced into a portion of a subterranean formation as part of a pre-pack procedure before a gravel packing treatment is conducted. This may have the advantage of consolidating relatively unconsolidated particulates and solids to prevent particulate migration into the gravel pack.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment fluid comprising a silica control agent and an aqueous base fluid, wherein the silica control agent is present in an amount of at least 75% of the saturation point in the treatment fluid; and,
wherein the silica control agent is selected from the group consisting of phenacite, willemite, zircon, olivine, garnet, thortveitite, benitoite, beryl, pyroxenes, enstatite, spodumene, pollucite, tremolite, crocidolite, petalite, cristobalite, calcium silicate, and any combination thereof;
placing the treatment fluid in a portion of a subterranean formation having a pH and a temperature and having in-situ silica therein wherein the in-situ silica substantially remains in the formation.

2. The method of claim 1, wherein the silica control agent is combined with the aqueous base fluid in an amount sufficient to form a treatment fluid saturated with silicate.

3. The method of claim 1, wherein the saturation of the silica control agent is combined with the aqueous base fluid in an amount sufficient to form a treatment fluid super-saturated with silicate.

4. The method of claim 1, wherein the silica control agent is combined with the aqueous base fluid in an amount sufficient to form a treatment fluid that is saturated when at the pH and temperature of the subterranean formation into which the treatment fluid is placed.

5. The method of claim 1, wherein the silica control agent further comprises sodium silicate having a weight ratio of $SiO_2$ to $Na_2O$ ranging from about 3.25:1 to 1.5:1.

6. The method of claim 1, wherein the silica control agent further comprises potassium silicate having a ratio of $SiO_2$ to $K_2O$ ranging from about 2.5:1 to 1.5:1.

7. The method of claim 1, wherein the treatment fluid further comprises gravel and is placed into the subterranean formation as part of a gravel packing operation.

8. The method of claim 1, wherein the silica control agent is in a physical form selected from the group consisting of: a colloidal suspension and a liquid.

9. A method comprising:
providing a treatment fluid comprising a silica control agent and an aqueous base fluid, wherein the silica control agent is present in an amount of at least 75% of the saturation point in the treatment fluid;
wherein the silica control agent is selected from the group consisting of phenacite, willemite, zircon, olivine, garnet, thortveitite, benitoite, beryl, pyroxenes, enstatite, spodumene, pollucite, tremolite, crocidolite, petalite, cristobalite, calcium silicate, and any combination thereof;
contacting a subterranean formation, the subterranean formation having a pH and a temperature and having in-situ silica therein wherein the in-situ silica substantially remains in the formation, with the treatment fluid at a pressure sufficient to fracture a portion of the subterranean formation; and,
recovering at least a portion of the treatment fluid.

10. The method of claim 9, wherein the silica control agent is combined with the aqueous base fluid in an amount sufficient to form a treatment fluid saturated with silicate.

11. The method of claim 9, wherein the saturation of the silica control agent is combined with the aqueous base fluid in an amount sufficient to form a treatment fluid super-saturated with silicate.

12. The method of claim 9, wherein the silica control agent is combined with the aqueous base fluid in an amount sufficient to form a treatment fluid that is saturated when at the pH and temperature of the subterranean formation into which the treatment fluid is placed.

13. The method of claim 9, wherein the silica control agent further comprises sodium silicate having a weight ratio of $SiO_2$ to $Na_2O$ ranging from about 3.25:1 to 1.5:1.

14. The method of claim 9, wherein the silica control agent further comprises potassium silicate having a ratio of $SiO_2$ to $K_2O$ ranging from about 2.5:1 to 1.5:1.

15. The method of claim 9, wherein the treatment fluid comprises at least about 50 ppm of the silica control agent.

16. The method of claim 9, wherein the silica control agent is in a physical form selected from the group consisting of: a colloidal suspension and a liquid.

* * * * *